United States Patent [19]

Jorgensen et al.

[11] Patent Number: 4,605,816
[45] Date of Patent: Aug. 12, 1986

[54] MOLDED OUTLET BOX WITH INTEGRAL CABLE CLAMP

[75] Inventors: Robert W. Jorgensen, Niles, Mich.; Thomas E. Lewis, South Bend, Ind.

[73] Assignee: Harvey Hubbell Incorporated, Orange, Conn.

[21] Appl. No.: 703,041

[22] Filed: Feb. 19, 1985

[51] Int. Cl.⁴ .............................................. H02G 3/08
[52] U.S. Cl. ..................................... 174/65 R; 220/3.2
[58] Field of Search ................ 174/53, 65 R; 220/3.2, 220/3.94; 339/103 R, 103 B, 103 C

[56] References Cited

U.S. PATENT DOCUMENTS

| | | | |
|---|---|---|---|
| Re. 23,720 | 10/1953 | Gillespie | 285/162 |
| 2,458,409 | 1/1949 | Paige | 285/162 |
| 2,556,977 | 6/1951 | Paige | 285/128 |
| 2,564,341 | 8/1951 | Paige | 285/162 |
| 2,706,647 | 4/1955 | Gillespie | 285/162 |
| 3,082,023 | 3/1963 | Rudolph et al. | 285/128 |
| 3,701,451 | 10/1972 | Schindler et al. | 220/277 |
| 3,895,732 | 7/1975 | Robinson et al. | 220/3.5 |
| 3,913,773 | 10/1975 | Copp et al. | 220/3.92 |
| 3,926,330 | 12/1975 | Deming et al. | 220/3.9 |
| 4,202,457 | 5/1980 | Tansi | 220/3.3 |
| 4,304,957 | 12/1981 | Slater et al. | 174/65 R |
| 4,304,958 | 12/1981 | Neff et al. | 174/65 R |
| 4,306,109 | 12/1981 | Nattel | 174/65 R X |
| 4,335,271 | 6/1982 | Haslbeck | 174/65 R |
| 4,366,343 | 12/1982 | Slater et al. | 174/65 R |
| 4,424,406 | 1/1984 | Slater et al. | 174/65 R |

Primary Examiner—Arthur T. Grimley
Assistant Examiner—D. A. Tone
Attorney, Agent, or Firm—Jerry M. Presson; Walter C. Farley

[57] ABSTRACT

A molded, thermoplastic outlet box is provided with openings near the back wall and clamp arrangements inside the openings. Each clamp arrangement includes a swingable clamp arm having teeth at the end thereof which cooperate with teeth formed on an inner wall of the box to engage a cable which has been inserted. An abutment prevents the clamp arm from swinging inwardly until a predetermined force has been exceeded. Flexibility of the arm is enhanced by parallel slots extending away from the opening on opposite sides of the clamp arm.

5 Claims, 5 Drawing Figures

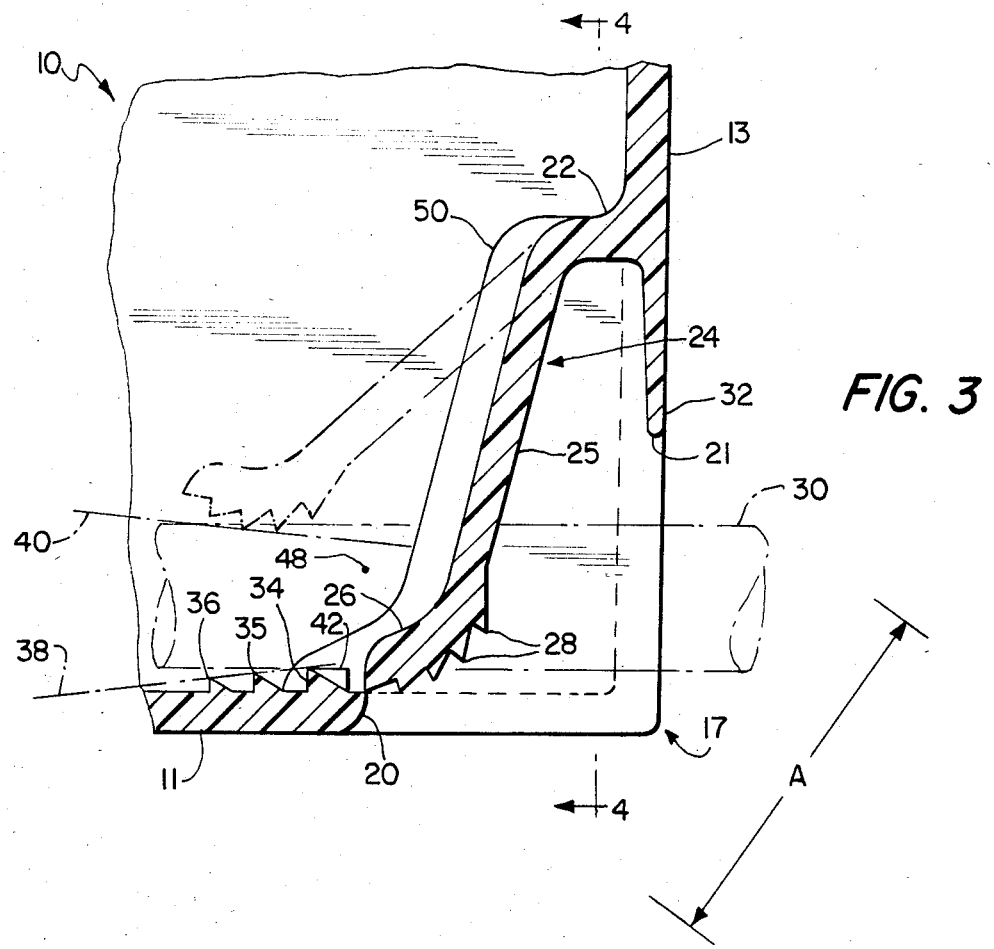
FIG. 3
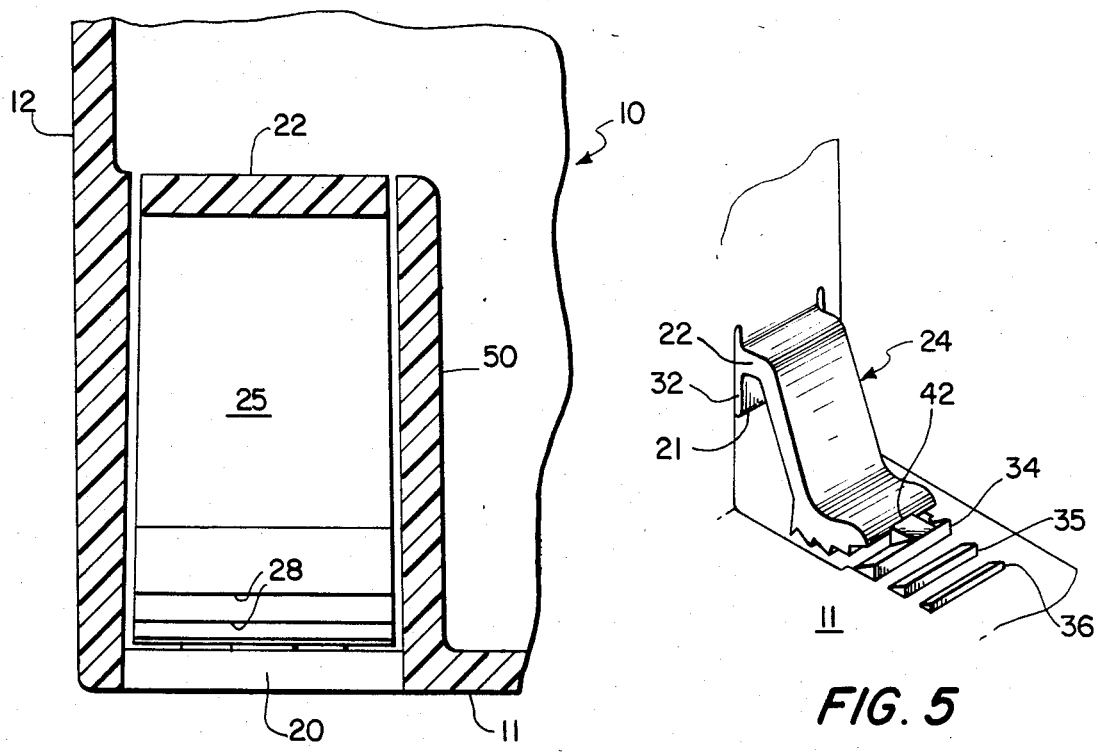
FIG. 4
FIG. 5

MOLDED OUTLET BOX WITH INTEGRAL CABLE CLAMP

This invention relates to an improved cable clamp which is integrally molded with a thermoplastic electrical outlet box.

BACKGROUND OF THE INVENTION

Electrical outlet boxes have been molded from thermoplastic materials in recent years and there have been efforts to provide integral cable clamps on such boxes. The objective is to form a clamp adjacent an opening through a wall of the box such that an end of the cable can simply be pushed into the box through the opening and past the clamp whereupon the clamp will take effect, preventing extraction of the cable in the absence of some positive action to defeat the operation of the clamp. Examples of devices which have been developed for this purpose are found in U.S. Pat. Nos. 4,304,958, Neff et al; 4,366,343, Slater et al; 4,202,457, Tansi; and 4,304,957, Slater et al.

Boxes and clamp arrangements such as those shown in these patents have encountered problems and have generally not met the conflicting requirements of this industry. For example, an arrangement of the general type shown in the aforementioned Neff et al patent encounters the conflicting requirements presented by codes and standards governing structural and performance characteristics of electrical devices of this type, on the one hand, and the desires of the electricians who buy and use these devices, on the other. Specifically, the standards established by Underwriters Laboratories for a molded outlet box require that the flexible, movable portion of the clamp withstand a ten pound force in response to which it either must not move or, alternatively, it must return to its original position when the force is removed. Another U.L. requirement limits the size of the cable entrance opening as defined by the fixed regions surrounding the opening. Contrary to the force test requirement, electricians are interested in minimum resistance to cable insertion so as to permit quick and easy installation. It has been found to be quite difficult to produce a clamp having sufficient flexibility to be acceptable in the marketplace and also enough stiffness or resilience to return to its original position after the application of a ten pound force.

SUMMARY OF THE INVENTION

An objective of this invention is to provide a molded outlet box having a movable, flexible clamping member adjacent an opening into the box which member can quickly and easily be moved by inserting the end of a cable with moderate force but which meets code requirements.

A further objective is to provide such a clamping member which has improved cable gripping characteristics.

Yet another objective is to provide such a box and clamp structure which can be easily molded from a thermoplastic material.

Briefly described, the invention includes a molded, thermoplastic outlet box having a back wall and at least one side wall intersecting to form a box having a front opening. At a corner formed by the intersection of the back wall and the at least one side walls is a generally L-shaped opening capable of receiving a cable. A flexible and resilient clamp arm is unitarily formed on an inner surface of either the side or the back wall, the clamp arm having a root portion extending inwardly from the wall to which it is attached spaced from the opening, an arm portion extending across the L-shaped opening toward the other wall, and a toothed portion at the end of the arm portion, the clamp arm being swingable between open and closed positions. First and second generally parallel slots are provided in the wall to which the root portion is attached, the slots extending away from the L-shaped opening on opposite sides of the point of attachment of the root portion. An abutment on the other wall engages the distal end of the toothed portion of the clamp arm to prevent movement of the arm away from the closed position until a force exceeding a predetermined force level is applied against the clamp arm to force it past the abutment.

In order to impart full understanding of the manner in which these and other objectives are attained in accordance with the invention, particularly advantageous embodiments thereof will be described with reference to the accompanying drawings, which form a part of this specification, and wherein:

FIG. 3 is a partial side elevation, in section, along line 3—3 of FIG. 2 with the clamp arm shown in two positions;

FIG. 4 is a partial end elevation, in section, along line 4—4 of FIG. 3; and

FIG. 5 is a partial perspective view of the interior of the box of FIG. 1 showing a clamp structure therein.

DESCRIPTION OF A PREFERRED EMBODIMENT

Figure 1:
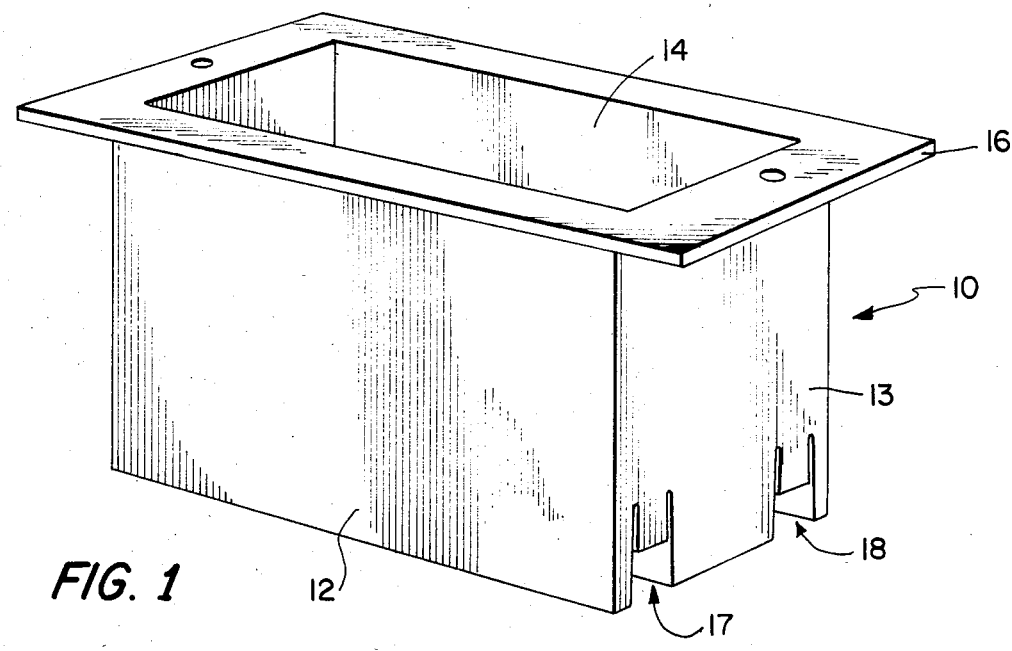
FIG. 1 is a perspective view of an outlet box incorporating the clamp structure of the present invention.
Figure 2:
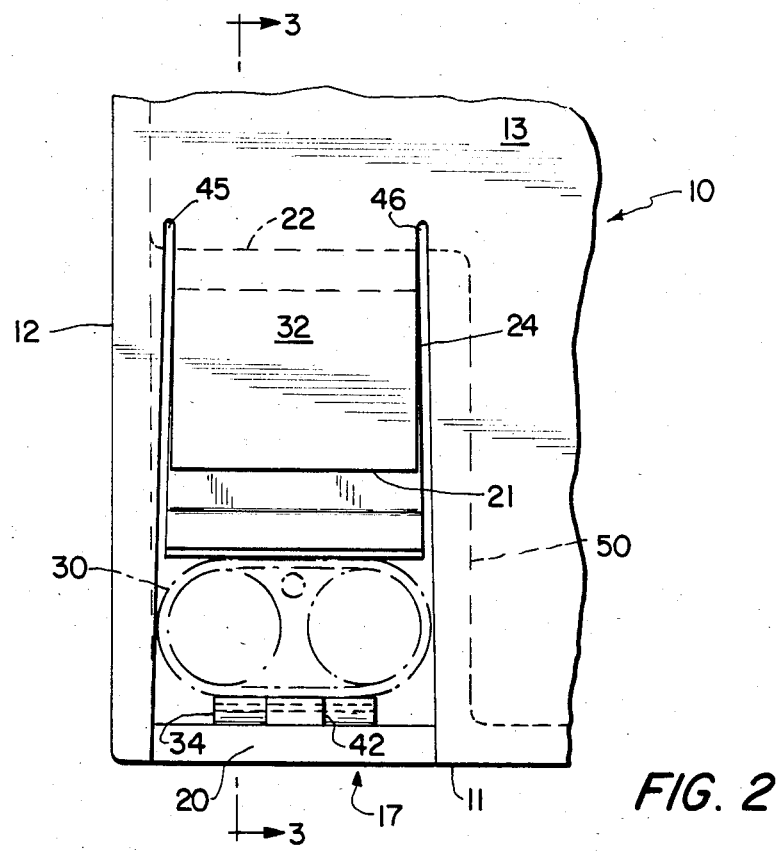
FIG. 2 is a partial end elevation of the outlet box of FIG. 1 showing a corner thereof with a clamp structure.

FIG. 1 shows a molded outlet box indicated generally at 10, the outlet box having a back wall, not visible in FIG. 1, and a plurality of side walls 12 and end walls 13 forming a container having a front opening 14 into which an electrical outlet, a switch or some other electrical device can be mounted. A mounting flange 16 can also be provided on the box although the specific mounting configuration is not particularly important to the present invention.

At the intersection of a side or end wall and the back wall are means defining openings indicated generally at 17 and 18, the openings being dimensioned to receive cables having electrical conductors therein for connection to devices within the interior volume of the outlet housing. Within openings 17 and 18 are clamp structures designed to engage the cable, particularly cable of the type having a rubber or thermoplastic covering.

The clamp and opening structure can be more clearly seen in FIGS. 2-5 in which the clamp structure within opening 17 is shown. As seen in FIG. 3, the opening itself is generally L-shaped and extends from the corner intersection of back wall 11 and end wall 13 into both of these walls, the limit in the back wall being a distal edge 20 and in the end wall a distal edge 21. The major portion of end wall 13 terminates at the location of the root portion 22 of a clamp arm indicated generally at 24. The root portion 22 of arm 24 extends inwardly generally perpendicularly from the inner surface of wall 13 for a relatively short distance and bends into an arm portion 25 which extends toward distal edge 20. At the end of arm portion 25 is a toothed foot portion 26 having teeth 28 protruding therefrom. In the position shown in solid lines in FIG. 3, the clamp arm occupies a position in which it extends across and substantially closes opening 17, limiting ingress to the interior volume of the box. A hinge region between arm portion 25 and root portion 22 is somewhat flexible so that arm 24 can be swung inwardly to a second position in which the opening is largely unobstructed and in which the toothed portion 26 is inwardly spaced from the inner surface of back wall 11. In that position, a cable 30 can enter the outlet box. However, arm 24 is sufficiently resilient so that teeth 28 are urged downwardly toward the upper surface of the cable.

A web 32 of reduced thickness acts as a continuation of wall 13 and closes a portion of opening 17 which would otherwise be open, thereby limiting the maximum opening as defined by pertinent standards to the distance A which can be dimensioned to accommodate cable and code requirements.

On the inner surface of back wall 11 are inwardly projecting teeth 34, 35 and 36 of progressively smaller dimensions. Each tooth is a transversely extending projection which is triangular in cross section as best seen in FIGS. 3 and 5. The altitudes of these triangles decrease so that the peaks of the teeth define a plane 38 which slopes toward the inner surface of wall 11 in the direction away from opening 17. The teeth 28 of toothed portion 26 are dimensioned and positioned so that, when the arm is in the second, open position, the teeth engaging the upper portion of cable 30 lie in a plane 40 which diverges away from plane 38 in the direction away from opening 17. Thus the teeth lying in plane 40 form a wedge-like relationship with the teeth peaks lying in plane 38 so that any effort to simply pull on cable 30 in the direction of extracting the cable from the box meets with increasing resistance as teeth 28 and teeth 34–36 bite into the covering of the cable with increasing force.

Generally speaking, the effort in prior devices of this type has been to produce a clamp arm design such that the arm has considerable stiffness and can thereby return to its original position after removal of the ten pound force required by the previously described test. The present invention employs a somewhat different approach, dimensioning arm 24 and its support structure so that it is quite flexible. Although resilient enough to press downwardly against the upper surface of cable 30 so that any effort to extract the cable will result in the cable being clamped as previously described, the arm alone is not capable of resisting significant inward forces. In order to comply with the code requirements regarding the ten pound test, tooth 34 is provided with a centrally positioned abutment 42 which projects from tooth 34 in the direction of the distal end of toothed portion 26. By the expedient of providing projection 42 such that it will be contacted by the distal end of arm 24, movement beyond the abutment in the direction of the open position shown in dashed lines is prevented until a force exceeding ten pounds is exerted against the outwardly facing surface of arm 24, this force ultimately causing the arm and its support to flex and assume sufficient curvature to shorten the distance between the root portion and the distal end, permitting the distal end to snap beyond the projecting corner of abutment 42, after which the arm can swing freely to the open position. As a practical matter, the ten pound force can be exceeded very easily with a relatively sharp inward poking movement with either the end of a cable 30 or with a tool such as a screwdriver or the like. This is done with sufficient ease so as to be quite acceptable to the users of this device while still complying fully with the letter and spirit of the applicable code.

Partly because of the presence of web 32 below root portion 22, it is difficult to dimension arm 24 so that it has the desired flexibility without decreasing the thickness of arm 24 to a fragile dimension. Web 32 is necessary, however, to keep the size of opening 17 within the U.L. requirements. In order to increase the flexibility of the arm so that the action described above can be accomplished, end wall 13 is provided with upwardly extending slots 45 and 46 which lie on either side of web 32 and extend upwardly not only beyond the upper limit of the web but also above the location on wall 13 from which the root portion 22 of clamp arm 24 extends. These slots separate the web and the root portion from laterally adjacent portions of wall 13 and greatly increase the flexibility of the region of the wall to which root portion 22 is attached. This increased flexibility together with the position of abutment 42 permits the structure to meet the code requirements. Slots 45 and 46 are each 0.030 inches in width, at most.

As will also be seen in FIG. 3, the specific construction of teeth 28 is improtant to the advantageous clamping relationship with teeth 34–36. Each tooth has a front face which lies along a radius, in the position shown in FIG. 3, radially from a center 48 which lies above distal edge 20. These radial faces are separated from each other by angles of 15 degrees and are joined by surfaces which form similar triangles. With this relationship, the desired clamping action is available.

Finally, a side wall 50 is provided in generally parallel relationship with side wall 12 so that, in the closed position of arm 24, there is no available opening of any significant size to the interior of the box. Wall 50 assists in guiding the cable into the interior.

It will be recognized that the connection point of arm 24 has been illustrated as being formed on end wall 13. However, there is no fundamental reason why the arm cannot be attached to back wall 11 or a side wall 12 should local code requirements permit. It will also be recognized that the clamp arrangement can be applied to boxes of other shapes such as those with a single, circular side wall or a larger number of walls forming, for example, a hexagonal box.

While one advantageous embodiment has been chosen to illustrate the invention, it will be understood by those skilled in the art that various changes and modifications can be made therein without departing from the scope of the invention as defined in the appended claims.

What is claimed is:

1. A molded, thermoplastic outlet box comprising
   a back wall and at least one side wall intersecting to form a box having a front opening;
   means at a corner formed by the intersection of said back wall and said at least one side wall defining a generally L-shaped opening extending away from said corner into both of said side and back walls to receive a cable;
   a flexible and resilient clamp arm unitarily formed on an inner surface of one of said side and back walls, said clamp arm having
      a root portion extending inwardly from a location on said one of said walls spaced from the distal edge of said one of said walls at said opening, an arm portion extending across said opening toward the other of said walls, and a toothed portion at the end of said arm portion, said clamp arm being swingable between a first position in which the distal end of said toothed portion is adjacent the distal edge of said other of said walls and a second position in which said toothed portion is spaced inwardly from said other of said walls;

means defining first and second generally parallel slots in said one wall extending away from said opening on opposite sides of and beyond said location of said root portion on said one wall; and means on said other of said walls forming an abutment adjacent the distal edge thereof for engaging said toothed portion of said clamp arm and preventing movement thereof away from said first position until said clamp arm is flexed by an inward force exceeding a predetermined level.

2. An outlet box according to claim 1 and further including a plurality of teeth on the inner surface of said other of said walls for cooperating with said toothed portion of said clamp arm to grip a cable inserted into said opening, said abutment being formed on the first of said teeth.

3. An outlet box according to claim 2 wherein the peaks of said teeth on the inner surface of said other of said walls lie in a plane which slopes toward said inner surface in the direction away from said opening, whereby said teeth cooperate with said toothed portion of said clamp arm to define a wedge-like passage for a cable inserted through said opening, said passage enlarging in the direction away from said opening.

4. An outlet box according to claim 3 wherein the width of each of said first and second slots is no greater than about 0.030 inches.

5. An outlet box according to claim 1 wherein the width of each of said first and second slots is no greater than about 0.030 inches.

* * * * *